July 24, 1951

R. E. MILLER 2,561,447

CONTROL DEVICE

Filed Oct. 27, 1945

INVENTOR
Raymond E. Miller
BY
ATTORNEY

Patented July 24, 1951

2,561,447

UNITED STATES PATENT OFFICE 2,561,447

CONTROL DEVICE

Raymond E. Miller, Wilkinsburg, Pa., assignor to The Westinghouse Air Brake Company, Wilmerding, Pa., a corporation of Pennsylvania Application October 27, 1945, Serial No. 625,094

12 Claims. (Cl. 74—213)

1

This invention relates to control devices and more particularly to means for controlling operation of a device in accordance with direction of operation of a reversible rotatable shaft.

In the patent to Roy R. Stevens, No. 2,482,301, there is disclosed a control apparatus for reversible Diesel engines embodying a directional control device which, in reversing the engine from operation in one direction to operation in the opposite direction, prevents fuel being supplied to the engine until the engine starts turning in said opposite direction, at which time said device responds to the turning of a rotatable part of the engine to promptly permit supply of fuel to the engine.

The directional control device above mentioned comprises a shoe having a concave surface for frictionally engaging the peripheral surface of the engine crankshaft or other rotatable shaft of the engine, and which shoe is capable of movement by said shaft transversely thereof the instant the crank shaft starts to turn in the direction opposite to that in which it was previously turning, for operating means to cause fuel to be supplied to the engine to permit prompt starting and running thereof on fuel.

The frictional contact between the shoe surface and the shaft above mentioned is liable to cause undesired wear of said shaft. Moreover shafts in different makes or sizes of engines may be of different diameters, and for each different diameter of shaft a shoe having a concave surface to fit said shaft will be required, thus necessitating as many different shoes as there are different diameters of shafts.

One object of the invention is therefore the provision of an improved directional control device, particularly adapted though not limited for use in connection with Diesel engines, and which is applicable to all engines regardless of the diameter of the engine crank shaft or other shaft which is employed for operating said device, and which will not cause wear of said shaft like the friction shoe above mentioned.

Other objects or advantages will be apparent from the following more detailed description of the invention.

Figure 1:
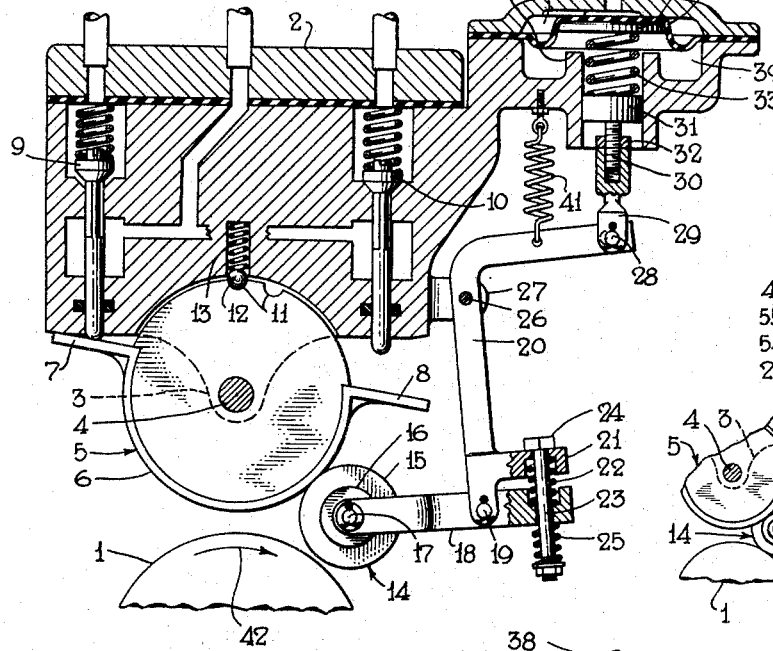
Figure 4:
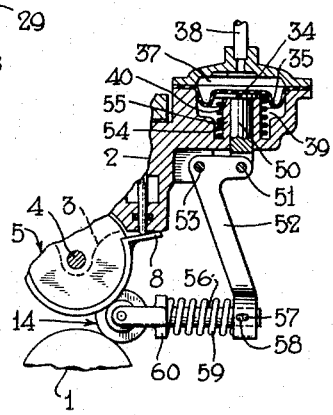
Figure 2:
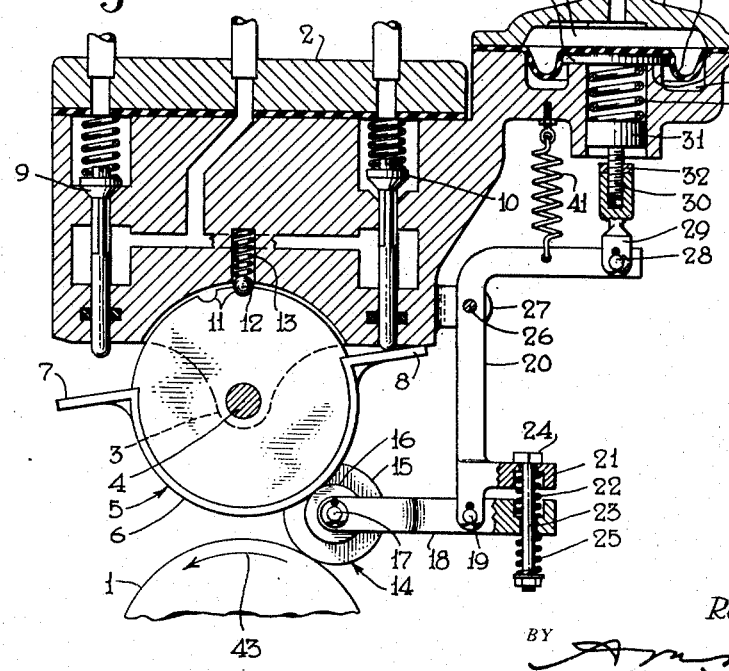
Figure 3:
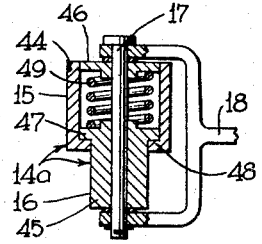

In the accompanying drawing: Fig. 1 is a cross-sectional view of a directional control device embodying one form of the invention; Fig. 2 is a view similar to Fig. 1 but showing the parts in a different position; Fig. 3 is a cross-sectional view of a modification of the invention; and Fig. 4 is a cross-sectional view of another modification of the invention.

2

Description

In the drawing, the reference numeral 1 indicates a portion of a reversible rotatable shaft which may be a portion of the crank shaft or cam shaft of a reversible engine or any other shaft which is rotatable in either one direction or in the opposite direction and with which it is desired to associate the invention.

At one side of the shaft 1 there is disposed a directional control device comprising a casing 2 having on the side adjacent the shaft 1 an ear or lug 3 carrying a fulcrum pin 4 upon which is journaled a rotatable member 5. The member 5 may be in the form of a disc having a circular surface 6 which is spaced from the peripheral surface of shaft 1. The member 5 is rockable on shaft 4 in either one direction or in the opposite direction to different control positions. One of these two positions may be defined by engagement with casing 2 of a finger 7 associated with the member 5, as shown in Fig. 1 of the drawing, while the other position may be defined by engagement with the casing of an oppositely arranged finger 8 associated with member 5, as shown in Fig. 2 of the drawing. Movement of the member 5 to its different positions may control any desired structure such as two valves 9 and 10, the former being openable by finger 7 upon movement of member 5 to the position shown in Fig. 1, while the valve 10 is openable by finger 8 upon movement of member 5 to the position shown in Fig. 2.

Valves such as 9 and 10 and their purpose in connection with a directional control device as employed in a control apparatus for a reversible Diesel engine are fully disclosed and described in the copending application hereinbefore referred to, and no further description thereof is considered essential in the present application.

In order to resiliently maintain the member 5 in each of its two different positions above mentioned and to also ensure against accidental movement of said member out of said positions, said member is provided with two recesses 11 which are spaced apart according to the spacing of said positions for receiving a detent in the form of a ball 12 carried by the casing 2 and urged against said member by a spring 13.

Disposed at one side of the member 5 and shaft 1 and in substantial alignment with the space between said member and shaft is a roller 14 for operatively engaging the peripheral surfaces of said member and shaft to render said shaft capable of turning said member. Preferably, the roller 14 is provided with two coaxial surfaces 15 and 16 formed at different diameters, the surface 15 of greater diameter being provided for contact with the shaft 1 and the surface 14 of smaller diameter being aligned with the surface 6 on member 5 for contact therewith.

The roller 14 is mounted on a pin 17 carried in one end of an arm 18 which is pivotally supported between its ends on a pin 19 carried by an actuating lever 20. The lever 20 has a lug 21 extending from the side opposite the roller 14 substantially parallel to the other end of arm 18, and interposed between said lug and said other end of arm 18 is a coil spring 22. A bolt 23 loosely extending through spring 22 and aligned openings in lug 21 and the arm 18 has a head 24 engaging the outer surface of lug 21, while secured in and engaging the opposite surface of arm 18 is a coil spring 25. The two springs 22 and 25 are under pressure and cooperate on arm 18 to maintain roller 14 in substantial alignment with the space between member 5 and shaft 1 when said roller is out of engagement with said member and shaft and to permit rocking of arm 18 on pin 19 to permit said roller to engage both said member and shaft, as will be clear from description to follow.

The lever 20 is in the form of a bell crank which is pivoted at its knee on a pin 26 carried by a lug 27 projecting from casing 2. The other end of lever 20 is connected by a pin 28 to one end of a link 29 the other end of which is screw-threaded internally to receive a stud 30 projecting from one side of a plunger 31 which is slidably mounted in a bore in casing 2. A lock nut 32 on stud 30 is provided for contact with the adjacent end of link 29 for securing the stud 30 to link 29 in an adjusted condition.

Engaging the opposite side of plunger 31 is one end of a coil spring 33. The opposite end of spring 33 engages a follower 34 mounted against one side of a movable abutment preferably in the form of a flexible diaphragm 35 which is clamped around its edge between casing 2 and a cover 36. Between diaphragm 35 and cover 36 is a pressure chamber 37 open to a pipe 38 through which fluid under pressure is adapted to be supplied to and released from said chamber. A chamber 39 at the opposite side of diaphragm 35 is open to atmosphere through clearance space (not shown) around the plunger 31.

A stop 40 in casing 2 is provided for contact with diaphragm follower 34 to limit deflection of diaphragm 35 by fluid under pressure in chamber 37. Deflection in the opposite direction upon relief of fluid under pressure from chamber 37 is adapted to be limited by engagement of diaphragm 35 with the cover 36.

A release spring 41 has one end connected to lever 20 while the opposite end is anchored to casing 2. This spring is under tension and is effective when fluid under pressure is released from diaphragm chamber 37 to rock lever 20 to the position in which it is shown in the drawing for thereby pulling roller 14 out of contact with shaft 1 and member 5 and for actuating plunger 31 and spring 33 to move diaphragm 35 into contact with cover 36.

When fluid under pressure is supplied to diaphragm chamber 37 the diaphragm 35 will deflect into contact with stop 40 and thereby displace the adjacent end of spring 33 in the direction of plunger 31 for actuating said plunger, the lever 20 and arm 18 for moving roller 14 into contact with shaft 1 and member 5, said arm pivoting about pin 19 to ensure such contact. The pressure with which roller 14 is forced against shaft 1 and member 5 is governed or limited by the pressure of spring 33 and by suitable adjustment of the stud 30 in the link 29, this pressure may be so regulated as to provide a non-slip drive connection between shaft 1 and the roller 14 and also a positive drive connection between said roller and member 5.

*Operation*

In operation, let it be initially assumed that the shaft 1 is turning in a clockwise direction, as indicated by arrow 42 in Fig. 1, that fluid under pressure is released from diaphragm chamber 37 permitting disengagement of roller 14 by spring 41 from the shaft 1 and member 5, and that said member is in the position in which it is shown in Fig. 1.

If fluid under pressure is now supplied through pipe 38 to chamber 37, the diaphragm 35 will be moved into contact with stop 40 and through spring 33 will actuate lever 20 to move surface 15 on roller 14 into driving contact with shaft 1 and surface 16 on said roller into driving contact with surface 6 on member 5. With shaft 1 turning in a clockwise direction the roller 14 will then turn in a counterclockwise direction and tend to turn the member 5 in a clockwise direction, but said member will remain stationary due to engagement of finger 7 with casing 2, so that the surface 16 on the roller 14 will merely turn against said member due to the fact that the radius of said surface is less than that of surface 15 engaging the shaft 1 which provides a mechanical advantage to the connection between the roller and shaft 1 to avoid or prevent slippage between the shaft 1 and roller and thus prevent undesired wear of said shaft.

Now let it be assumed that, with roller 14 in contact with shaft 1 and member 5, said shaft is stopped and started up in a counterclockwise direction, indicated by the arrow 43 in Fig. 2 of the drawing. As soon as the shaft 1 starts to turn in the counterclockwise direction, it will drive the roller 14 in a clockwise direction and said roller in turn will turn member 5 in a counterclockwise direction from the position in which it is shown in Fig. 1 of the drawing to that in which it is shown in Fig. 2 of the drawing. As soon as the member 5 obtains the position in which it is shown in Fig. 2, finger 8 will engage casing 2 and prevent further movement of said member in a counterclockwise direction, following which, the roller 14 as long as it continues to be driven by shaft 1 will merely turn relative to and against said member. Then upon release of fluid under pressure from diaphragm chamber 37, the release spring 41 will move roller 14 out of engagement with shaft 1 and member 5.

Now assume that roller 14 is in engagement with shaft 1 and member 5 with said shaft turning in a counterclockwise direction and that the direction of rotation of said shaft is reversed to clockwise. The instant the shaft 1 starts to turn in the clockwise direction, the turning of roller 14 against surface 6 on member 5 will turn said member from the position in which it is shown in Fig. 2 to the position in which it is shown in Fig. 1. When this latter position is obtained member 5 will stop moving but roller 14 will continue to be turned by shaft 1 against said member until fluid under pressure is released from diaphragm 37 to permit disengagement of roller 14 from shaft 1 by the release spring 41.

The pipe 38 may correspond to the starting pipe in a control apparatus for Diesel engines such as disclosed in the aforementioned copending application, and which in reversing the engine from operation in one direction to operation in the opposite direction is supplied with fluid under pressure upon initiating the reversal and until after the engine starts to operate in the opposite direction at which time the fluid under pressure is released from said pipe. With the directional control device embodying the invention applied to a Diesel engine, it will therefore be seen that in reversing the engine from operation in one direction to operation in the opposite direction, the roller 14 would be moved into contact with shaft 1 and member 5 upon initiating the reversal, so as to be promptly effective to reverse the member 5 from one position to the other, depending upon the direction of last operation of the engine, the instant the engine starts to turn in the said opposite direction. After the engine starts to turn in the opposite direction just mentioned the release of fluid under pressure from pipe 38 would result in disengagement of roller 14 from the shaft 1 and member 5.

When the roller is in contact with shaft 1 said roller will always turn with said shaft even though the member 5 may be held stationary by either finger 7 or finger 8 engaging the casing, due to the surface 15 on said roller being formed at a greater diameter than the surface 16 which contacts said member, as hereinbefore mentioned. As a result, there will be no rubbing of roller 14 against the shaft 1, except at the instant of contact, so there will be substantially no wear of said shaft incident to operation of said roller. When the member 5 is stationary, the rubbing of surface 16 against said member will however tend to wear both said surface and member, but said surface and the contacting surface of said member may be hardened to minimize such wear.

Description Fig. 3

Wear of surface 16 and of the contacting surface 6 of member 5 may however be substantially eliminated by use of a roller assembly means or assembly 14a shown in Fig. 3 of the drawing, instead of roller 14 shown in Figs. 1 and 2.

The roller assembly 14a comprises two spool-like elements 44 and 45 mounted for rotation on the pin 17, and provided respectively with the surfaces 15 and 16. The element 44 is a hollow cup-shaped element having an opening through the closed end through which extends the element 45. The opposite open end of the element 44 is closed by a member 46 journaled on the pin 17 and supporting this end of element 44. The opposite end of element 44 is supported on element 45 which is supported through out its length on pin 17. The element 45 is provided with a head 47 disposed within the element 44 and having on one side a surface frictionally engaging a surface provided on a portion 48 of element 44 which encircles the opening through which the element 45 extends. A spring 49 in element 44 is supported at one end by member 46 and bears at the opposite end against head 47. This spring is under pressure and forces the head 47 on element 45 against the cooperating portion 48 of element 44 with a sufficient degree of pressure to cause operation of element 44 by element 45 to turn member 5 from either one of its positions to the other but insufficient to turn element 44 against said member when said member is stationary. By this arrangement it will therefore be seen that the roller assembly 14a will actuate the member 5 the same as roller 14 shown in Figs. 1 and 2, but with said member stationary there will be no rubbing of surface 16 on said roller against said member since the clutch like structure connecting the elements 44 and 45 together will permit rotation of element 44 relative to and without turning element 45.

Description Fig. 4

If preferred, the spring 33, plunger 31, link 29 and springs 22 and 25 may be eliminated along with their functions, and a structure such as shown in Fig. 4 of the drawing may be used instead. According to this modification, the diaphragm follower 34 is provided with a stem 50 extending to the exterior of the casing where it is connected by a pin 51 to one end of a bell crank 52 which is pivoted at its knee on a pin 53 carried by the casing. A release spring 54, employed in place of the release spring 41 shown in Fig. 1 of the drawing, is disposed in chamber 39 around a boss 55 and acts on follower 34 to urge the diaphragm 35 to its normal position in which it is shown in Fig. 1. The boss 45 is provided with a bore through which the follower stem 50 extends and in the end of this boss there is provided the stop 40 for engagement by follower 34 to limit deflection of said diaphragm by fluid under pressure in chamber 37.

The roller 14 or roller assembly 14a, as the case may be, is carried in one end of an arm 56 which is slidably mounted in a bore provided through the depending arm of bell crank 52. Within the bell crank the arm 56 is provided with a pin 57 which extends into slot 58 (only one of which is shown) in the bell crank extending longitudinally of said arm, whereby the connected end of the bell crank is capable of a certain degree of movement relative to the arm 56 in the direction of the length of said arm. Encircling the arm 56 is a coil spring 59 bearing at one end against the bell crank 52 and at the opposite end against a collar 60 on said arm. The spring 59 is under pressure and is effective when the roller 14 or roller assembly 14a is out of contact with shaft 1 and member 5 to maintain said roller or assembly in substantial alignment with the space between said shaft and member.

When the diaphragm 34 is operated by fluid under pressure supplied to chamber 37 to the position defined by contact between follower 34 and stop 40, in which position these parts are shown in Fig. 4 of the drawing, the pin 57 permits rocking of arm 56 so that the roller 14 or roller assembly 14a can engage both the shaft 1 and member 5 and when such engagement is obtained the pin 57 will be disengaged from the ends of slots 58 so that the pressure of said roller or assembly against said shaft and member will be limited to the pressure of spring 59. Spring 59 thus accomplishes the same function as springs 33, 22, and 25 in the structure shown in Figs. 1 and 2 of the drawing.

The operation of this modified form of the invention is otherwise the same as that of the structure shown in Figs. 1 and 2.

Summary

It will now be seen that I have provided a directional control device which is adapted to be employed with a shaft of any diameter for detecting rotation or change in direction of rotation thereof and which will not cause any appreciable wear of the shaft. The structure of the directional control device provides for limiting the pressure of the detecting element against the shaft to only that necessary to accomplish the intended result, and the detecting element may, if desired, be constructed to prevent rubbing contact against and wear of the member which it engages when said member is in a stationary condition.

While the direction controlling or detecting device is particularly adapted for use in connection with Diesel engine control apparatus such as above mentioned, it is equally adapted to other uses. It is not the intention, therefore, to limit the scope of the invention except by the terms of the appended claims.

Having now described my invention, what I claim as new and desire to secure by Letters Patent, is:

1. A directional control device adapted to be adjusted in accordance with direction of rotation of a reversible shaft comprising a rockable member, roller means operable by driving engagement with said shaft to rock said member, actuating means operable by fluid under pressure to move said roller means into driving engagement with said shaft, pressure limiting means in the connection between said roller means and actuating means for limiting the force of contact between said roller means and shaft, and means for moving said roller means out of contact with said shaft upon release of fluid under pressure from said actuating means.

2. A directional control device adapted to be adjusted in accordance with the direction of rotation of a reversible shaft comprising a rockable member to be adjusted, a rotatable member, means for moving said rotatable member into driving engagement with said shaft, means for moving said rotatable member out of driving engagement with said shaft, stop means engageable by said rockable member for limiting movement of said rockable member to a zone extending between and including two positions, actuating means for rocking said rockable member to said positions, and clutch means connecting said rotatable member to said actuating means and operable to transmit power to said actuating means sufficient for rocking said rockable member but insufficient to operate said actuating means upon engagement of said rockable member with said stop means.

3. A directional control device adapted to be adjusted in accordance with the direction of rotation of a reversible shaft comprising a rockable member to be adjusted having a circular surface, stop means for limiting movement of said member to a zone extending between and including two different positions, roller means, actuating means connected to said roller means for moving said roller means into driving engagement with said circular surface and at the same time with the peripheral surface of said shaft, means for moving said roller means out of contact with said surfaces, and pressure limiting means in the connection between said actuating means and roller means for limiting the pressure of said roller means against said surfaces.

4. A directional control device adapted to be adjusted in accordance with the direction of rotation of a reversible shaft comprising a rockable member to be adjusted having a circular surface, stop means for limiting rocking movement of said member to a zone extending between and including two different positions, roller means comprising one element movable into rolling driving engagement with said circular surface and a second element movable into rolling driving engagement with the peripheral surface of said shaft, said roller means further comprising slip clutch means connecting said second element to said one element for turning said one element by said second element, and means for moving said roller means into and out of driving engagement with said surfaces.

5. A directional control device adapted to be adjusted in accordance with the direction of rotation of a reversible shaft comprising a rockable member to be adjusted having a circular surface, stop means for limiting rocking movement of said member to a zone extending between and including two different positions, roller means comprising one part for having rolling driving engagement with said circular surface and a second part of greater diameter for having rolling driving engagement with the peripheral surface of said shaft, means for moving said roller means into and out of driving engagement with said surfaces, said roller means also comprising a friction clutch connecting said one part to said second part for operating said second part to turn said member, said clutch comprising means for limiting the force transmitted thereby to a degree less than required to turn said second part upon cessation of movement of said member by said stop means.

6. A directional control device adjustable in accordance with the direction of rotation of a reversible shaft comprising a casing, a rockable member journaled on said casing and having a circular surface spaced from the peripheral surface of said shaft, means for limiting rocking movement of said member in either one direction or in the opposite direction to a zone including two different positions, means operable by said rockable member in each of its different positions, roller means for engaging said circular surface and at the same time the peripheral surface of said shaft, actuating means carried by said casing and carrying said roller means and operable to move said roller means into and out of driving engagement with said surfaces, and resilient means for supporting said roller means in substantial alignment with the space between said surfaces when said roller means is disengaged from said surfaces.

7. A directional control device adjustable in accordance with the direction of rotation of a reversible shaft comprising a casing, a rockable member journaled on said casing and having a circular surface spaced from the peripheral surface of said shaft, means for limiting rocking movement of said member in either one direction or in the opposite direction to a zone including two different positions, means operable by said rockable member in each of its different positions, roller means for engaging said circular surface and at the same time the peripheral surface of said shaft, actuating means carried by said casing and carrying said rollers means, and resilient means in the connection between said actuating means and roller means for transmitting force from said actuating means to said roller means for moving said roller means into driving engagement with said surfaces.

8. A directional control device adjustable in accordance with the direction of rotation of a reversible shaft comprising a casing, a rockable member journaled on said casing and having a circular surface spaced from the peripheral surface of said shaft, means for limiting rocking movement of said member in either one direction or in the opposite direction to a zone including two different positions, means operable by said rockable member in each of its different positions, roller means for engaging said circular surface and at the same time the peripheral surface of said shaft, a lever carried by said casing, an arm pivotally carried by said lever for movement transversely of said shaft and carrying said roller means, resilient means cooperative with said lever and arm to support said roller means in substantial alignment with the space between said surfaces, and means for actuating said lever and arm to move said roller means into and out of driving engagement with said surfaces.

9. A directional control device adjustable in accordance with the direction of rotation of a reversible shaft comprising a casing, a rockable member journaled on said casing and having a circular surface spaced from the peripheral surface of said shaft, means for limiting rocking movement of said member in either one direction or in the opposite direction to a zone including two different positions, means operable by said rockable member in each of its different positions, roller means for engaging said circular surface and at the same time the peripheral surface of said shaft, control means associated with said casing carrying said roller means and movable by fluid under pressure to move said roller means into driving engagement with said surfaces, resilient means in the connection between said control means and roller means for limiting pressure of said roller means against said surfaces, and means for moving said roller means out of engagement with said surfaces.

10. A directional control device adjustable in accordance with the direction of rotation of a reversible shaft comprising a casing, a rockable member journaled on said casing and having a circular surface spaced from the peripheral surface of said shaft, means for limiting rocking movement of said member in either one direction or in the opposite direction to a zone including two different positions, means operable by said rockable member in each of its different positions, roller means for engaging said circular surface and at the same time the peripheral surface of said shaft, an actuating member carried by said casing, an arm pivotally carried by said actuating member for movement relative to said actuating member in a direction from one of said surfaces to the other and providing for movement of said actuating member relative to said arm in a direction toward the space between said surfaces, a spring interposed under pressure between said actuating member and arm for supporting said roller means in substantial alignment with said space when disengaged from said surfaces and for transmitting force from said actuating member to said arm to press said roller means into driving engagement with said surfaces, and means for operating said actuating member to move said roller means into and out of driving engagement with said surfaces.

11. A directional control device adjustable in accordance with the direction of rotation of a reversible shaft comprising a casing, a rockable member journaled on said casing and having a circular surface spaced from the peripheral surface of said shaft, means for limiting rocking movement of said member in either one direction or in the opposite direction to a zone including two different positions, means operable by said rockable member in each of its different positions, roller means for engaging said circular surface and at the same time the peripheral surface of said shaft, a lever carried by said casing, an arm pivotally carried by said lever for movement transversely of said shaft and carrying said roller means, resilient means cooperative with said lever and arm to support said roller means in substantial alignment with the space between said surfaces, a spring for moving said lever and arm to move said roller means into contact with said surfaces, control means for compressing said spring to render it effective, and means for actuating said lever and arm to move said roller means out of contact with said surfaces.

12. A directional control device adjustable in accordance with the direction of rotation of a reversible shaft comprising a casing, a rockable member journaled on said casing and having a circular surface spaced from the peripheral surface of said shaft, means for limiting rocking movement of said member in either one direction or in the opposite direction to a zone including two different positions, means operable by said rockable member in each of its different positions, roller means for engaging said circular surface and at the same time the peripheral surface of said shaft, fluid pressure operable actuating means carried by said casing and carrying said roller means and comprising resilient pressure transmitting means operable upon movement of said actuating means by fluid under pressure to move said roller means into driving engagement with said surfaces, means for limiting movement of said actuating means by fluid under pressure, and means for moving said roller means out of engagement with said surfaces.

RAYMOND E. MILLER.

REFERENCES CITED

The following references are of record in the file of this patent:

UNITED STATES PATENTS

| Number | Name | Date |
|---|---|---|
| 1,553,780 | Keeler | Sept. 15, 1925 |
| 2,115,438 | Wolf | Apr. 26, 1938 |

FOREIGN PATENTS

| Number | Country | Date |
|---|---|---|
| 24,552 | Great Britain | Jan. 14, 1899 |
| 631,960 | Germany | June 30, 1936 |